United States Patent [19]
Aldred

[11] 3,811,524
[45] May 21, 1974

[54] GRASS CUTTING OR THE LIKE MACHINES

[75] Inventor: Edward John Aldred, Ipswich, England

[73] Assignee: Ransomes Sims & Jefferies Limited, Ipswich, Suffolk, England

[22] Filed: Feb. 17, 1972

[21] Appl. No.: 227,103

[30] Foreign Application Priority Data
Feb. 17, 1971 Great Britain...................... 4829/71

[52] U.S. Cl................................ 180/6.2, 180/19 H
[51] Int. Cl........................ B62d 11/08, B62d 51/04
[58] Field of Search............ 180/19 H, 19 S, 6.2, 6.7

[56] References Cited
UNITED STATES PATENTS

| | | | |
|---|---|---|---|
| 3,166,141 | 1/1965 | Shields et al...................... | 180/6.2 X |
| 2,191,426 | 2/1940 | Clapper............................ | 180/6.2 X |
| 3,055,445 | 9/1962 | Mendez et al...................... | 180/6.7 |
| 1,734,718 | 11/1929 | Donald............................ | 180/6.2 |
| 1,774,451 | 8/1930 | Norelius.......................... | 180/6.2 |
| 1,779,583 | 10/1930 | Blydenburgh....................... | 180/6.2 |
| 2,585,315 | 2/1952 | Herman........................... | 180/19 H |
| 2,680,947 | 6/1954 | Weimer........................... | 180/6.2 X |

FOREIGN PATENTS OR APPLICATIONS
893,187   1/1944   France............................. 180/195

*Primary Examiner*—David Schonberg
*Assistant Examiner*—John A. Pekar
*Attorney, Agent, or Firm*—Browdy and Neimark

[57] ABSTRACT

A power-driven grass cutting or the like machine having an operator's handle formed of an upstanding support and two handle bars which are rotatably mounted on the support. Two driving wheels upon which the machine is supported are each provided with a braking mechanism and the braking mechanisms are coupled to respective handle bars. Steering of the machine is effected by rotating one handle bar to operate the associated braking mechanism. Braking is effected by rotating both handle bars together. A further control is mounted on the handle bars and can be operated whilst steering or braking.

6 Claims, 4 Drawing Figures

GRASS CUTTING OR THE LIKE MACHINES

This invention relates to grass-cutting or the like machines.

According to the invention there is provided a grass-cutting or the like machine comprising means for driving moving parts of the machine, means coupling the driving means to a pair of ground engaging elements upon which the machine is supported, and braking mechanisms respectively associated with the pair of ground engaging elements, wherein an operating handle is provided at the rear of the machine, the handle comprising an upstanding support and a pair of handle bars each of which extends transversely of the support and is rotatably mounted thereon, means couple each handlebar to a respective one of the braking mechanisms, whereby steering is effected by rotating one of the handle bars, thereby to operate the braking mechanism associated with that handle bar, and braking of the machine is effected by rotating both handle bars together, and a control member for effecting some further change in the operation of the machine whilst steering or braking is provided on at least one handle bar.

The driving means may comprise an engine and a differential mechanism which couples the engine to the pair of ground engaging elements. Alternatively, the driving means may comprise an engine and clutch mechanisms which couple the engine to respective ground engaging elements, the clutch mechanisms being coupled to respective handle bars so that rotation of a handle bar releases the associated clutch mechanism in addition to operating the associated braking mechanism.

The driving means may be a pedestrian controlled machine or it may be a pedestrian controlled machine which is provided with a trailing seat for an operator.

The invention will now be described by way of example, with reference to the accompanying drawings, in which:

FIG. 4 is an alternative operating mechanism for the machine of FIGS. 1 and 2.

Figure 1:
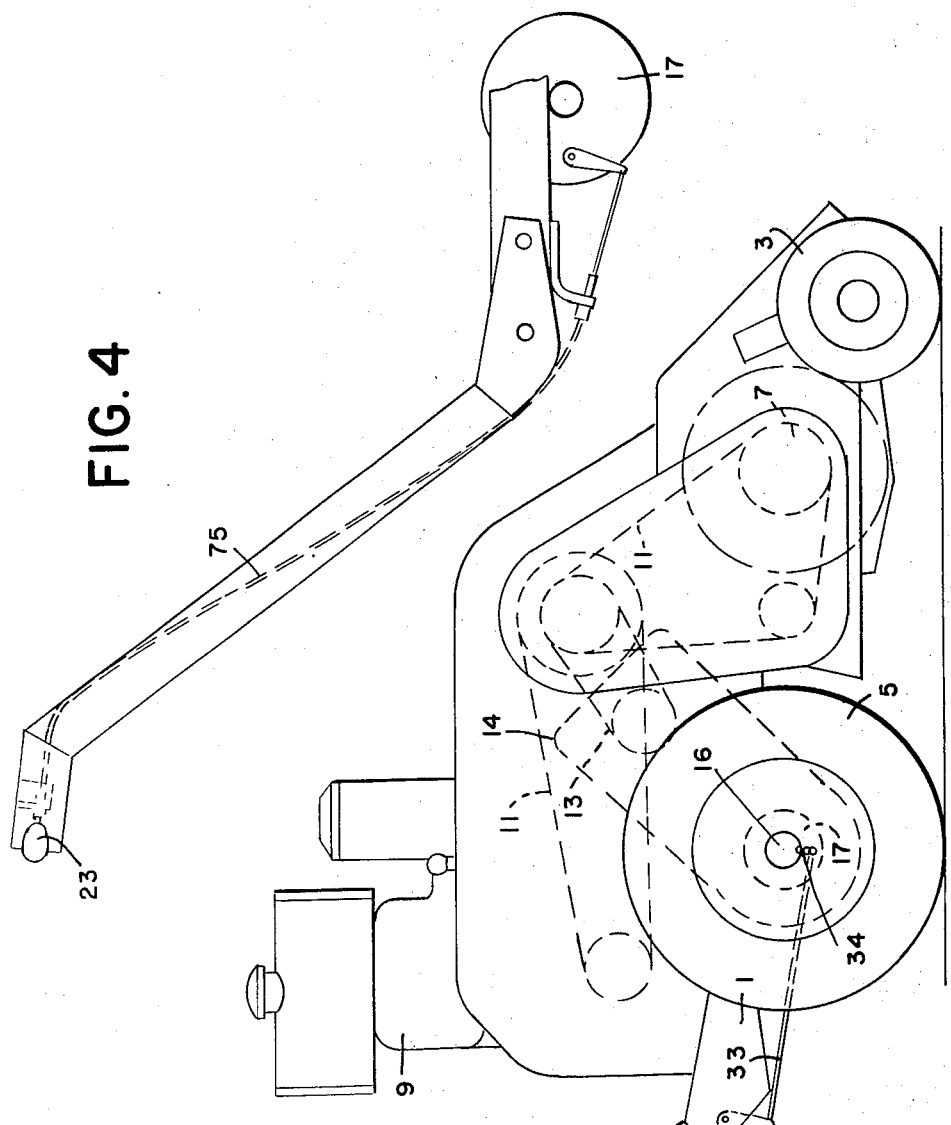
FIG. 1 is a side elevation of a grass cutting machine according to the invention.
Figure 2:
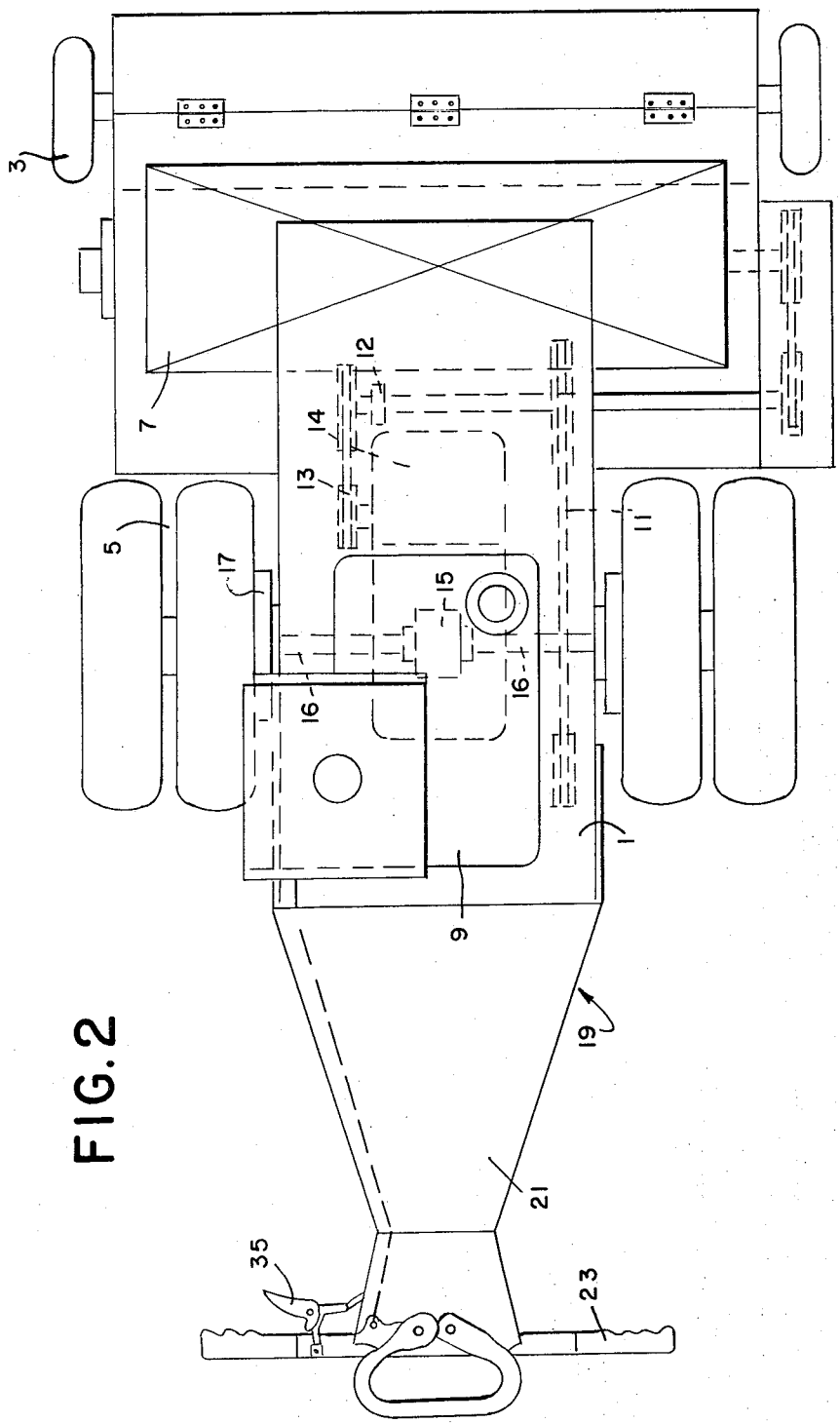
FIG. 2 is a plan view of the machine shown in FIG. 1.

The machine shown in FIGS. 1 and 2 of the drawings is a pedestrian controlled grass cutting machine having a frame 1 supported at the front thereof on a pair of side rollers 3 and at the rear on a pair of driving wheels 5. Mounted on the frame 1 is a power-driven grass cutting mechanism 7 and a petrol engine 9 for driving moving parts of the machine. The engine 9 is coupled to the cutting mechanism 7 by means of a belt drive 11 and to the driving wheels 5 via the belt drive 11, a clutch 12, a belt drive 13 and a gearbox 14. The gear box 14 includes a differential 15. Each driving wheel 5 is connected to the differential 15 by a halfshaft 16 and is provided with a braking mechanism 17 for use in steering and braking the machine.

At the rear of the present machine there is an operator's handle 19 formed of an upstanding support 21 and two handle bars 23 which extend transversely from the top of the support 21. Each handle bar 23 is associated with a respective one of the braking mechanisms 17 and is pivotally mounted on the support 21 for movement in a generally horizontal plane.

Coupling each handle bar 23 to the associated braking mechanism 17 are mechanical linkages. In each of these linkages there is first a short rod 25 which couples the handle bar 23 to one arm of a bell crank lever 27 pivotally mounted on an upper end of the support 21. The other arm of the lever 27 is coupled by means of a longer rod 29 to one arm of a second bell crank lever 31 pivoted at the bottom of the support 21. Finally, a rod 33 couples the other arm of the lever 31 to an operating lever 34 of one of the braking mechanisms 17.

Each of the mechanical linkages is so arranged that pivotal movement of a handle bar 23 so as to move the handle bar rearwardly of the machine operates the associated braking mechanism 17. The driving wheel 5 associated with that handle bar 23 is therefore braked.

Mounted on one of the handle bars 23 of the present machine is a lever 35 for operating the clutch 12 which couples the engine 9 to the driving wheels 5.

In use of the present machine an operator can readily steer by pulling rearwardly on one or other of the handle bars 23. This operates the associated braking mechanism 17 as described above, and brakes the appropriate driving wheel 5. For example, the machine can be steered to the right by pulling the righthand handle bar 23 rearwardly, thereby braking the righthand driving wheel 5. To brake the machine both handle bars are pulled rearwardly at the same time. Whilst performing either of these operations the operator can readily operate the control lever 35.

The present machine is designed for operation by an operator walking at the rear of the machine. A similar arrangement of pivotal handle bars, mechanical linkages and braking mechanisms can be provided on a machine having a trailing operator's seat fitted thereto.

Figure 3:
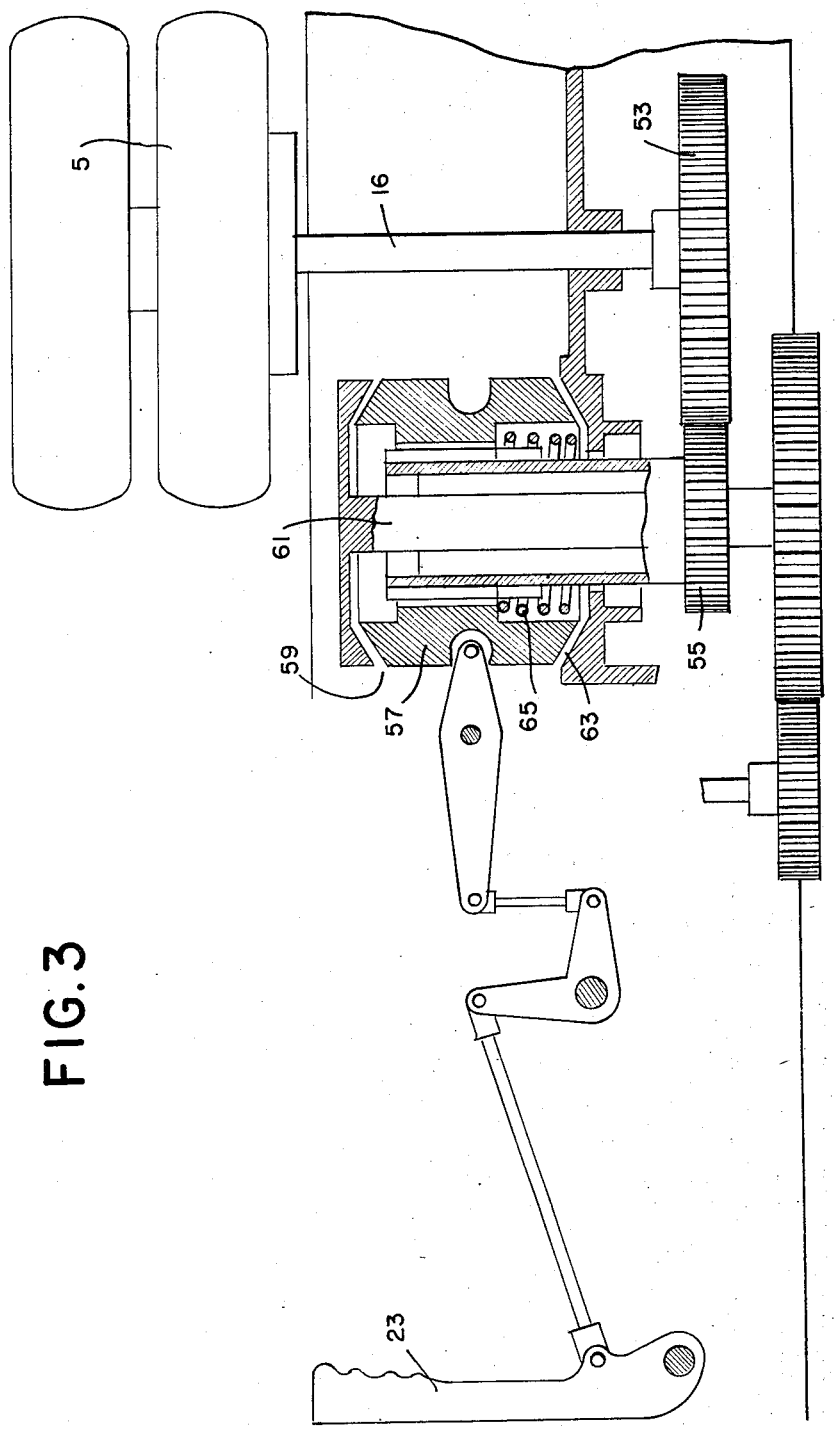
FIG. 3 is an alternative transmission for the machine of FIGS. 1 and 2.

In the alternative transmission of FIG. 3 each driving wheel 5 is mounted on a half shaft 16 which is coupled via gears 53 and 54 to an independent drive shaft 55. Keyed to the shaft 55 is a driven disc 57 which has friction surfaces at each end thereof. One of these friction surfaces forms part of an auxiliary clutch 59 whose driving member is mounted on a main drive shaft 61, which is connected via the main gearbox (not shown) to the engine. The other friction surface on disc 57 forms part of a braking mechanism 63. A spring 65 urges the disc 57 towards a position wherein the clutch 59 is engaged. Drive disc 57 is connected via the above mentioned linkages to one of the handle bars 23.

In use, pivotal movement of a handle bar 23 causes the associated driven disc 57 to be moved along the independent drive shaft 55 to a position wherein the clutch 59 is disengaged and the braking mechanism 63 is applied.

In the alternative operating mechanism of FIG. 4 each handle bar 23 is coupled to a braking mechanism 17 via a Bowden cable 75, which replaces the mechanical linkages of the machine described with reference to FIGS. 1 and 2.

The grass cutting mechanism in the machines described above can be a cylinder, rotary, flail or cutter bar mechanism.

The rear of the frame 1 in FIG. 1 can be supported on a full width split roller instead of the driving wheels 5. In this case each half of the roller is provided with its own braking mechanism independently operable from an associated handle bar for steering purposes.

It will be appreciated that other types of machine which have two driven ground wheels can be steered by braking mechanisms associated with respective wheels and operable by pivotally mounted handle bars upon which other controls of the machine are mounted, as described above. Examples of such machines are two wheel tractors and motor hoes which are primarily pedestrian controlled machines where all the controls have to be operated by hand.

Each handle bar 23 could be rotatable about its own axis instead of being pivoted at or near one end thereof.

I claim:

1. A grass cutting or the like machine comprising driving means for driving moving parts of the machine, coupling means coupling the driving means to a pair of ground engaging elements upon which the machine is supported, and braking mechanisms respectively associated with the pair of ground engaging elements, wherein an operating handle is provided at the rear of the machine, the handle comprising an upstanding support and a pair of handle bars which extend transversely of the support, each handle bar being pivotally mounted at or near one end thereof on the support for rearward movement in a generally horizontal plane, means coupling each handle bar to a respective one of the braking mechanisms such that steering is effected by pivoting one of the handle bars rearwardly towards an operator of the machine, thereby to operate the braking mechanism associated with that handle bar, and braking of the machine is effected by pivoting both handle bars rearwardly together, and a control member for effecting some further change in the operation of the machine and operable by the operator without removing his hands from the handle bars and thereby interrupting steering or braking, is provided on at least one handle bar.

2. A machine as claimed in claim 1, wherein the means which couple each handle bar to a respective one of the braking mechanisms comprise mechanical linkages.

3. A machine as claimed in claim 1, wherein the means which couple each handle bar to a respective one of the braking mechanisms comprise a Bowden cable.

4. A machine as claimed in claim 1, wherein the driving means comprise an engine and a differential mechanism which couples the engine to the pair of ground engaging elements.

5. A machine as claimed in claim 1, wherein the driving means comprise an engine and a pair of clutch mechanisms which couple the engine to respective ground engaging elements, the clutch mechanisms being coupled to respective handle bars so that rotation of a handle bar releases the associated clutch mechanism in addition to operating the associated braking mechanism.

6. A machine as claimed in claim 1 which is adapted for control by a pedestrian but which is provided with a trailing seat for an operator.

* * * * *